United States Patent [19]

Nilsson et al.

[11] Patent Number: 5,828,477
[45] Date of Patent: Oct. 27, 1998

[54] MULTI-TONE PHASE MODULATION FOR LIGHT WAVE COMMUNICATION SYSTEM

[75] Inventors: Alan C. Nilsson, Mountain View; Chien-Yu Kuo, Cupertino; Joseph Kleefeld, Palo Alto; Charles H. Gall, Newark; Alfred Nicholson Riddle, Milpitas; Harry Chou, San Jose, all of Calif.

[73] Assignee: Harmonic Lightwaves, Inc., Sunnyvale, Calif.

[21] Appl. No.: 559,057

[22] Filed: Nov. 16, 1995

[51] Int. Cl.⁶ ............................................. H04B 10/04
[52] U.S. Cl. ............................................. 359/181
[58] Field of Search ................................... 359/180, 181, 359/183, 188, 173, 195, 161

[56] References Cited

U.S. PATENT DOCUMENTS

| | | | |
|---|---|---|---|
| 4,560,246 | 12/1985 | Cotter | 350/96.16 |
| 5,166,821 | 11/1992 | Huber | 359/238 |
| 5,200,964 | 4/1993 | Huber | 372/26 |
| 5,212,579 | 5/1993 | Huber et al. | 359/182 |
| 5,243,613 | 9/1993 | Gysel et al. | 372/26 |
| 5,293,547 | 3/1994 | Gysel et al. | 359/337 |
| 5,301,054 | 4/1994 | Huber et al. | 359/132 |
| 5,315,426 | 5/1994 | Aoki | 359/180 |
| 5,329,396 | 7/1994 | Fishman et al. | 359/173 |
| 5,359,450 | 10/1994 | Ramachandran et al. | 359/188 |
| 5,373,385 | 12/1994 | Darcie et al. | 359/162 |
| 5,420,868 | 5/1995 | Chrsplyvy et al. | 370/122 |

OTHER PUBLICATIONS

F. W. Willems et al., "Harmonic distortion caused by stimulated Brillouin scattering suppression in externally modulated lightwave AM–CATV systems", Electronics Letter, vol. 30, No. 4, 17 Feb. 1994, pp. 343–345.

D. Cotter, "Suppression of Stimulated Brillouin Scattering During Transmission of High–Power Narrowband Laser Light in Monomode Fibre", Electronics Letters, vol. 18, No. 15, 22 Jul. 1982, pp. 638–639.

N. A. Olsson and J. P. Van Der Ziel, "Fibre Brillouin amplifier with electronically controlled bandwidth" Electronics Letters, vol. 22, No. 9, 24 Apr. 1986, pp. 488–490.

Y. Aoki et al., "Observation of stimulated Brillouin scattering in a single–mode fibres with single–frequency laser–diode pumping", Optical and Quantum Electronics, 19 (1987), pp. 141–143.

N. A. Olsson and J. P. Van Der Ziel, "Characteristics of a Semiconductor Laser Pumped Brillouin Amplifier with Electronically Controlled Bandwidth", Journal of Lightwave Technology, vol. LT–5, No. 1, Jan. 1987, pp. 147–153.

A. Bolle, et al., "Influence of Phase Modulation on the Brillouin Gain Curve," Department of Applied Electron Physics, Chalmers University of Technology, S–41296 Goteborg, Sweden, pp. 119–122.

(List continued on next page.)

*Primary Examiner*—Rafael Bacares
*Attorney, Agent, or Firm*—Skjerven, Morrill, MacPherson, Franklin & Friel LLP; Norman R. Klivans

[57] ABSTRACT

An optical transmission system enables launching at least 17 dBm of optical power at 1550 nm wavelength into an e.g. 50 km long span of standard telecommunications single-mode optical fiber, without incurring unacceptable penalties from stimulated Brillouin scattering, damage to optical phase modulators from excessive drive power or thermal effects, or signal degradations caused by the SBS suppression. High frequency modulation of the laser drive current is combined with lower frequency modulation of the phase of the laser output light that is itself varied over a range of approximately 25 MHz. This two tone modulation raises the SBS threshold to greater than 17 dBm in the 1550 nm wavelength region when the laser has a line width less than 10 MHz, under cw operation. By thereby dividing the task of spectral partitioning between the laser and the phase modulator, the RF input power level to the phase modulator is manageable and the laser operates in a regime that does not cause clipping.

29 Claims, 2 Drawing Sheets

OTHER PUBLICATIONS

Yasuhiro Aoki, et al., "Input Power Limits of Single–Mode Optical Fibers due to Stimulated Brillouin Scattering in Optical Communication Systems," Journal of Lightwave Technology, May 1988, vol. 6, No.5, pp. 710–719.

Andrew r. Chraplyvy, "Limitations on Lightwave Communications Imposed by Optical–Fiber Nonlinearities," Oct. 1990, Journal of Lightwave Technology, vol. 8, No. 10. pp. 1548–1557.

A. Hirose, et al., "Suppression of Stimulated Brillouin Scattering and Brillouin Crosstalk by Frequency–Sweeping Spread–Spectrum Scheme," 1991, Journal of Optical Communications.

A. Hadjifotiou and G. A. Hill, "Suppression of Stimulated Brillouin backscattering by PSK modulation for high–power optical transmission," Aug. 1986, IEE Proceedings, vol. 133, pt.J. No. 4, pp. 256–258.

D. Cotter, "Transient Stimulated Brillouin Scattering in Long Single–Mode Fibres,", Jun. 10, 1982, Electronic Letters, vol. 18, No. 12, pp. 504–506.

MULTI-TONE PHASE MODULATION FOR LIGHT WAVE COMMUNICATION SYSTEM

BACKGROUND OF THE INVENTION

1. Field of the Invention

This invention relates to optical transmission systems and more specifically to a fiber optic transmission system carrying a broadband signal over single mode optical fiber with high optical launch power over long distances with suppression of stimulated Brillouin scattering.

2. Description of the Prior Art

Economical distribution of broadband signal content (such as multi-channel cable TV) over a single mode optical fiber system requires use of high optical signal powers. High optical signal powers enable the splitting of the optical signal for distribution over multiple fiber paths or alternatively a transmission of signals over a single fiber path with a large allowed link loss, as is typical of long distance transmissions. The availability of efficient erbium doped fiber amplifiers (EDFAs) operating in the 1550 nm wavelength region, where standard telecommunication fiber exhibits its minimum attenuation, has motivated the development of broadband transmitters compatible with the gain bandwidth of EDFAs. Standard telecommunication single mode fiber (e.g. Corning SMF-28 fiber) exhibits significant dispersion in the 1550 nm region, however. This precludes the use of directly modulated distributed feedback lasers (DFBs) as a transmitter for cable television or high bit-rate digital signals. Instead, a typical transmitter operating at 1550 nm includes a narrow line width, cw DFB laser and an external modulator. The DFB laser light beam carries no information-bearing signals until the external modulation acts on the laser light beam to impress the information-bearing signals thereon. (It is to be understood that "light" here is not restricted to the visible spectrum.) The optical power is amplified by an EDFA which is downstream from the external modulator. Thus the information bearing light signal enters the fiber optic span with an optical signal determined by the saturated output power of the EDFA. Commercially available EDFAs offer saturated output powers exceeding 20 dBm.

As is well known, stimulated Brillouin scattering (SBS) is a nonlinear optical effect that poses a significant restriction to the amount of narrow-linewidth optical power that can be launched into a long length of single mode optical fiber. For a given length of single-mode fiber with a given attenuation coefficient at the chosen optical wavelength, there is an optical-linewidth-dependent threshold power below which SBS does not occur. For standard commercially available telecommunication fiber operating at 1550 nm, the SBS threshold for an optical source (laser) with an optical linewidth less than 10 MHz is approximately 5 dBm for a fiber optic link of approximately 50 kilometer length.

If dispersion were not an issue, SBS could be avoided simply by using an optical source with a line width which is large compared to the Brillouin gain linewidth (20 MHz to 100 MHz). For example, the effective linewidth of a directly modulated 1310 nm DFB laser can be many GHz, which explains why SBS is not a significant problem for high power 1310 nm directly modulated laser transmitters. Standard telecommunication fiber exhibits minimal chromatic dispersion at approximately 1310 nm, but the chromatic dispersion at 1550 nm is large (about +16 ps/nm·km). Dispersion at 1550 nm in standard telecommunication fiber provides a means by which phase noise in the optical source converts to intensity noise after propagation through a long length of fiber. Thus the frequency-dependent intensity noise resulting from phase noise in the optical signal source limits the achievable carrier to a noise ratio (CNR) in long length fiber spans.

Thus it is well known that in order to launch high optical signal powers in the 1550 nm wavelength region for transmission of broadband signals such as cable television over long fiber distances, one must suppress SBS. SBS creates excessive noise in the received signal, causes distortion, especially composite second order distortion, and induces power-dependent nonlinear attenuation in the fiber optic link, thereby also reducing the received optical power.

Prior art attempts to suppress SBS typically involve manipulation of the optical spectrum of the transmitter output signal. This is done by variously (1) choice of the unmodulated line width of a cw optical source, (2) phase modulation of the output of a cw optical source, or (3) frequency modulation of an optical source.

The first and last of these have significant drawbacks. The first causes enhanced intensity noise, caused by conversion of phase noise to intensity noise in the long fiber link, which degrades the CNR of the received signal. Degradation increases with signal bandwidths and fiber lengths. The third has similar disadvantages.

The second approach, which is phase modulation of the output of a cw optical source, has been the most common. See F. W. Willems et al. "Harmonic distortion caused by stimulated Brillouin scattering suppression in externally modulated lightwave AM-CATV systems", Electronics Letters, Vol. 30, No. 14, 17 Feb. 1994, pages 343–345. This discloses that over a length of 50 kilometers of standard telecommunications fiber, unacceptable spurious signals at the phase modulation frequency and its harmonics appear, owing to the conversion of phase modulation to intensity modulation.

See also Huber, U.S. Pat. No. 5,200,964, showing in FIG. 2 modulating the output of a cw laser with a 1 GHz sine wave, and showing the third approach in FIG. 3, where a DFB laser is directly modulated with a 1 GHz sine wave, to broaden linewidth.

A. Hirose, et al., "Suppression of Stimulated Brillouin Scattering . . . ", *Journal of Optical Communication*, 12 (1991) 3 p. 82, discloses (see FIG. 4) directly modulation of a laser by a 1 Mz sinusoidal signal for spectrum spreading, to suppress SBS.

Other attempts using phase modulation to suppress Brillouin scattering use dispersion-shifted fiber and typically use relatively low optical launch powers into the fiber and/or relatively short fiber spans i.e. 25 kilometers or less. Typically, it has been found that the threshold for SBS is, for instance, around 13 or 14 dBm of total launch power from the EDFA. Typically the phase modulation is at a frequency of 1 to 2 GHz.

Thus the prior art approaches do not address the practical limitations associated with the approaches to suppress SBS. The prior art approaches do not provide any means of providing high launch powers into an optical fiber span for standard single mode fibers greater than for instance 30 kilometers in length.

SUMMARY

In accordance with the invention, the optical spectrum is managed such that a practical solution is provided to the technical problem of launching at least 17 dBm of optical power at 1550 nm into an e.g. 50 kilometer long link of standard telecommunications single-mode fiber, without incurring unacceptable penalties from SBS, damage to optical phase modulators from excessive RF drive power and thermal effects, or CATV signal degradations caused by the SBS suppression technique and its interaction with dispersion and multipath interference phenomena in the optical fiber. Thus in accordance with the invention for an exemplary 17 dBm launch power, SBS is suppressed so that there is an increase in the SBS threshold of at least 12 dB, without causing any unacceptable degradation in the cable TV (CATV) signal quality at the end of a 50 kilometer link of standard single mode fiber.

This is accomplished by combining high frequency modulation of the DFB laser drive current with externally imposed phase modulation of the DFB output light beam at a lower frequency that is itself varied over a range of e.g. 25 MHz. This multi-tone spectral manipulation has been found to raise the SBS threshold to greater than 17 dBm in the 1550 nm wavelength range, when the DFB laser has a linewidth of less than 10 MHz under cw operation. By thereby dividing the tasks of spectral partitioning between the DFB laser and the phase modulator in one embodiment of the invention, the RF input power level to the phase modulator becomes manageable, and the DFB laser can be operated in a regime that does not cause signal clipping.

Thus the DFB laser current is modulated and the phase of the DFB output light is also modulated but at a lower frequency, and the two frequencies have a ratio of e.g. approximately 5 to 2 but are non-commensurate. Thus this is a two tone modulation with non-commensurate frequencies. Non-commensurate means, in this context, that there are no solutions to the equation $Mf_1=Nf_2$, where M and N are each e.g. integers less than 10.

DETAILED DESCRIPTION

Figure 1:
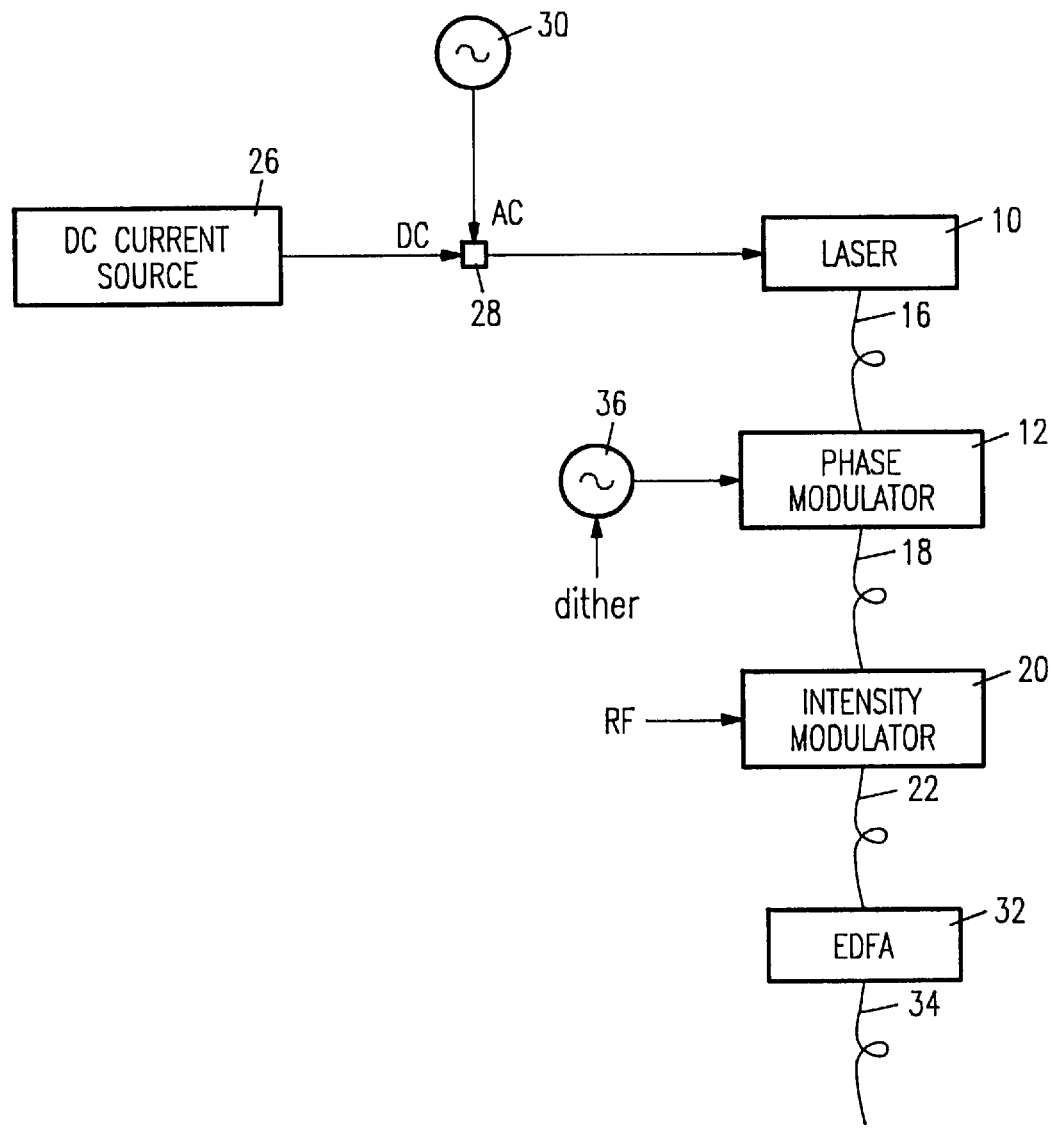
FIG. 1 shows a block diagram of a transmitter for an optical transmission system in accordance with the present invention.

FIG. 1 shows the transmitter portion of an optical transmission system in accordance with the present invention. The optical output of DFB laser 10 is conventionally optically coupled to the input port of an electro-optic phase modulator 12 (of the type commercially available) by a length of optical fiber or optical coupler (coupling element) 16. The optical input port of intensity modulator 20 is similarly optically coupled to phase modulator 12 by optical coupling element 18. The RF (e.g. CATV) information carrying signal is coupled to the RF input port of intensity modulator 20. The light output from intensity modulator 20 is coupled by another optical coupling element 22 to conventional EDFA 32 which launches the output optical signal into the optical fiber span 34 and ultimately to the receiver (not shown).

A source of direct current 26 conventionally drives the laser 10. In accordance with the invention, an oscillator 30 provides a high frequency signal, i.e. in the several gigahertz range, to modulate the current which drives laser 10. In one embodiment of the invention this modulation is at 5.31±0.01 GHz. Oscillator 30 is e.g. a voltage controlled oscillator (VCO) of the type well known in the art. A second VCO 36 provides a second (different) high frequency signal which is coupled to the phase modulation port of phase modulator 12. The signal from VCO 36 is in one embodiment at a center frequency of 2.15±0.01 GHz and is subject to frequency excursions of e.g. 25 MHz (less than 50 MHz) applied at a 10 kHz dither rate by a dither signal as shown.

Thus VCO 30 provides a sinusoidal voltage signal which is amplified if necessary (see further disclosure below) to provide the required drive voltage level, and this signal is combined with a conventional laser supply DC bias voltage in a bias tee 28. When modulated in this fashion, the optical output of the DFB laser 10 exhibits a combination of intensity modulation and frequency modulation. The frequency modulation index is set to approximately 2.4 when only the DFB laser 10 is modulated.

Similarly, the second VCO 36 provides a signal which is subject to appropriate amplification (as discussed below) so that the signal level is set to provide a desired phase modulation index of approximately 2.4. This index of modulation can be achieved with a commercially available integrated optical modulator that combines the phase and intensity modulators 12, 20 into a single device, as described below. The RF drive power required to produce this index of modulation at 2.15 GHz has not shown any signs of degrading the performance of such an integrated optical modulator.

Thus in combination, the two modulation processes of the transmitter of FIG. 1 provide a two tone modulation with non-commensurate frequencies. If there were no intensity modulation on the DFB laser, the resulting increase in SBS threshold would be approximately the product of the increases associated with the two individual modulation processes. This multi-tone phase/frequency modulation has been found to greatly improve the efficiency of SBS suppression and enables the practical implementation of SBS suppression, even for 17 dBm launch optical power into 50 kilometer of SMF-28 optical fiber 34.

In this case, the VCO 36 is driven by a ramp voltage waveform with a 10 kHz repetition rate and with a voltage amplitude such that the total frequency excursion of the output of VCO 36 is approximately 25 MHz. This additional frequency modulation of the input signal to phase modulator 12 suppresses potentially interfering spurious intensity modulation signals caused by the conversion of the phase modulation to intensity modulation in the optical fiber 34.

It is to be understood that the particular presently disclosed output frequencies of oscillators 30 and 36 are not limiting but are illustrative and were arrived at empirically; thus these are somewhat component-dependent, and for other lasers and other types of phase and intensity modulators other combinations of modulation tones may be better and are within the scope of the present invention. The two tones are non-commensurate as defined previously, thus improving suppression of SBS. It has also been found that if there is a fairly wide separation in absolute terms between the frequencies of the two tones, that SBS suppression is enhanced.

As described above, in one embodiment of the present invention no oscillator 30 is present and instead all of the modulation is applied to phase modulator 12 by oscillator 36. However, it has been found for practical reasons that there are limits as to how much RF power one may apply to a phase modulator, and especially to a phase modulator of the type which is integrated with the intensity modulator, before undesirable side effects occur that are irreversible and induce losses in the phase modulator waveguide or destruction of the waveguide or electrodes. Thus by in effect splitting up the required modulation between the laser and the phase modulator, a maximum safe amount of modulated power may be applied to the phase modulator, while still enabling efficient SBS suppression for 17 dBm launch power. Hence the present inventors have determined that this splitting up of the modulation is desirable, and that in such a multi-tone process the best results were achieved with the above-described relationship between the frequencies of the two tones and the variation of one of the tones in terms of the frequency excursions.

Figure 2:
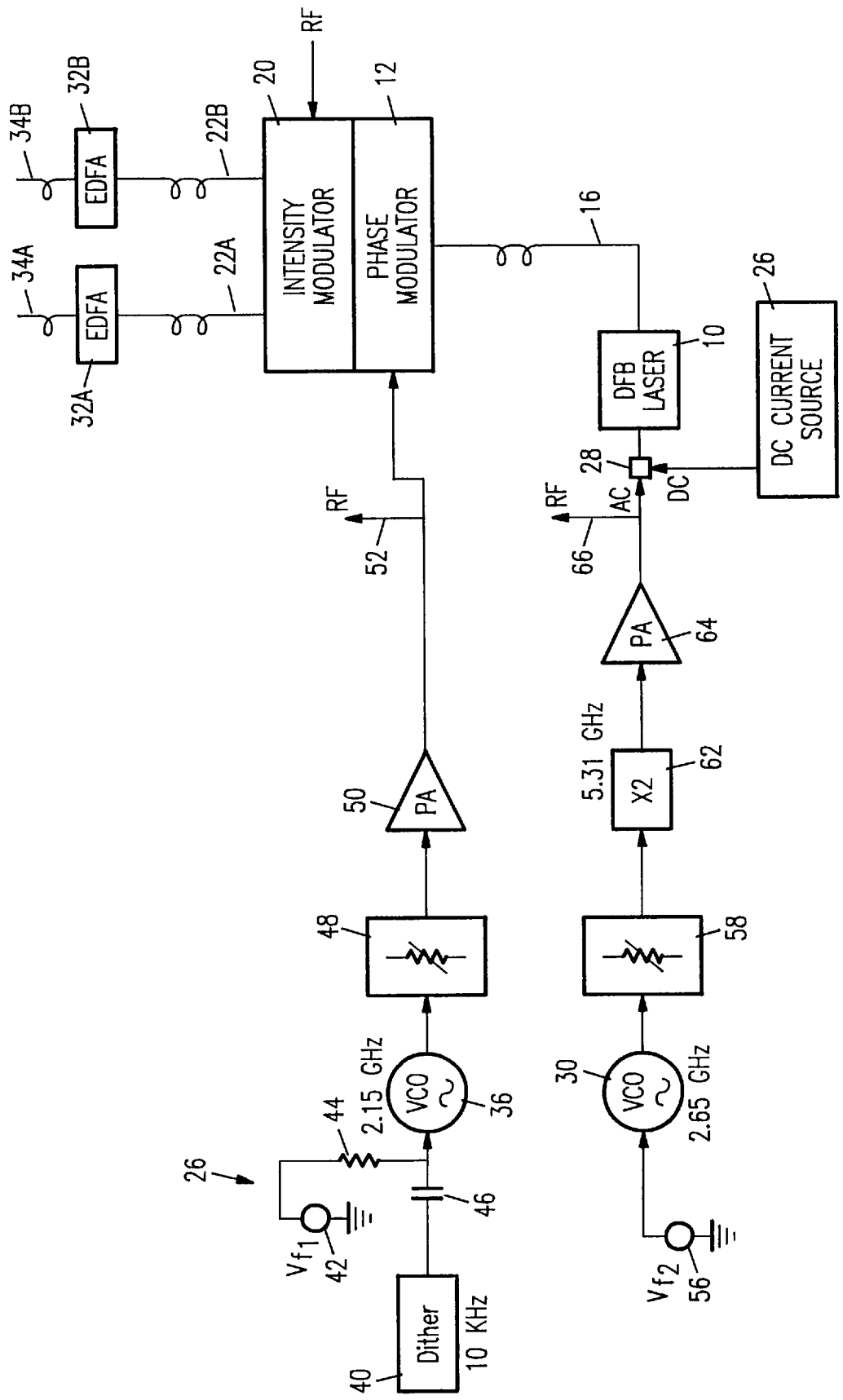
FIG. 2 shows in more detail the transmitter of FIG. 1.

FIG. 2 shows the transmitter of FIG. 1 in additional detail; common elements have identical reference numbers. In FIG. 2 the bias voltage that determines the center frequency of the output of VCO 36 is provided by a voltage source $Vf_1$ 42 applied via a resistor 44 to the input terminal of the VCO 36 here set to operate at 2.15 GHz. The dither generator 40 provides an e.g. 10 kHz variation to the VCO 36 in order to provide the 25 MHz excursions in the VCO 36 frequency output. The dither signal is AC-coupled to VCO 36 via a capacitor 46. The output signal from VCO 36, which is centered so as not to affect the center frequency at 2.15 GHz with the above-described excursions, is then applied to a conventional RF attenuator 48 which provides the function of gain control. An RF attenuator is used to set the overall level of the signal. RF attenuators work well on low-level signals where power-handling is not a concern. The output terminal of attenuator 48 is connected to the input terminal of a conventional radio frequency power amplifier 50 which provides an RF output power of approximately 1 watt. The output terminal of power amplifier 50 is then connected to the phase modulation input port of phase modulator 12. Also, the output terminal of power amplifier 50 is connected to an RF power detector 52 in order to measure the actual output power for adjustment purposes, as described below.

In this case, the intensity modulator 20 and phase modulator 12 are a single integrated component, e.g. the Uniphase Telecommunications Products APE dual output modulator for cable television transmitters which operates at 1550 nm. This component provides two fiber optic output ports here labelled 22a and 22b, each of which partially drives an EDFA respectively 32a and 32b and an output fiber span respectively 34a and 34b. In another embodiment, only one output fiber span is used.

Of course, use of such an integrated phase/intensity modulator is not necessary if the insertion loss of separate components can be tolerated, and these could instead be two separate components connected as shown in FIG. 1. Note that the RF signal applied to the RF terminal of the intensity modulator 20 is e.g. a cable television signal which is a broad band RF input signal which typically has been pre-distorted for linearized modulator response, as is well known in the art.

In the lower arm of FIG. 2, the second voltage source $Vf_2$ 56 controls the frequency of a second VCO 30 which here operates at 2.65 GHz, providing that signal to an attenuator 58 which is similar to attenuator 48. The output terminal of attenuator 58 is connected to a conventional frequency doubler 62. The frequency doubler 62 is used in this embodiment because it is easier to generate a 2.65 GHz signal than a signal of twice that frequency; as will be readily understood, alternately one could use a VCO or other type of oscillator to directly provide the desired output frequency, without any frequency doubling.

The output terminal of the frequency doubler 62 is connected to the input terminal of a second power amplifier 64 (or series of amplifiers) which is similar to power amplifier 50. The output signal strength of power amplifier 64 is approximately 1 watt in this embodiment. A second power detector 66 detects the power output from power amplifier 64 for adjusting purposes.

The output terminal power amplifier 64 also connects to bias tee 28 which also connects to the drive current input terminal of DFB laser 10. Typically, also connected to this power input terminal via bias tee 28 is DC current source 26. An example of a DFB laser 10 is the AT&T Microelectronics 246-type Astrotec digital isolated DFB laser module. Other types of directly modulatable narrow linewidth, single frequency lasers may be used. Alternatively, a cw single frequency laser could be used if an additional phase modulator were inserted between the laser and the phase modulator 12 of FIG. 1. Also, it should be noted that there is no requirement that the present system operate at 1550 nm but other frequencies may be used.

The two power detectors 52, 66 provide dual functionality. A first function is during ordinary operation of the transmitter to ensure that the power outputs are at the desired level.

A second function of the power detectors 52 and 66 is during adjustment of the system, which is typically performed when it is assembled but may be performed dynamically in use. In one embodiment, the transmitter is adjusted when first assembled at the factory by setting an index of frequency modulation for the laser 10. This is done by adjusting the RF input level to laser 10 from power amplifier 64 as measured by power detector 66, by adjusting the attenuator 58. Typically, a spectrum analyzer or frequency counter determines the input frequency of the AC drive current to DFB laser 10 and another device is used as a meter to measure the phase modulation frequency being applied to phase modulator 12. Thus the amount of RF power is also tuned in the upper arm by adjusting attenuator 48 to achieve the desired phase modulation index.

It is to be understood that in another embodiment the power detectors 52 and 66 may each be connected in a closed loop feedback system to control the amount of attenuation by respectively attenuators 48 and 58 to dynamically alter the power levels, to provide maximum signal strength for a given frequency modulation index.

This description is illustrative and not limiting. Further modifications will be apparent in light of this disclosure to those skilled in the art. Also, other components may be substituted for the ones described herein and other operating parameters in terms of frequencies, power levels, modulation indexes, and light wavelength may be used and still fall within the scope of the invention as defined by the appended claims.

We claim:

1. An optical fiber transmission system comprising:
   a light source outputting a light beam which is coupled to an optical phase modulator;
   an intensity modulator driven by an information-carrying RF signal and coupled to an output port of the phase modulator;
   a connector for connecting an output port of the intensity modulator to an optical fiber;
   a first source of a first frequency signal driving the phase modulator; and
   a second source of a second frequency signal driving the light source; wherein the second source includes a DC current source and an oscillator providing an alternating current, to drive the light source with a second high frequency signal.

2. The system of claim 1, wherein the first frequency signal is at a frequency exceeding 1 GHz.

3. The system of claim 1, wherein the first frequency signal and the second frequency signal are not commensurate to one another.

4. The system of claim 1, wherein the first and second frequency signals are designated $f_1$ and $f_2$ and are non-commensurate to one another wherein there are no solutions to the equation $Mf_1=Nf_2$, M and N being integers less than 10.

5. The system of claim 1, wherein the first frequency signal is of non-constant frequency.

6. An optical fiber transmission system comprising:
a light source outputting a light beam which is coupled to an optical phase modulator;
an intensity modulator driven by an information-carrying RF signal and coupled to an output port of the phase modulator;
a connector for connecting an output port of the intensity modulator to an optical fiber;
a first source of a first frequency signal driving the phase modulator;
a second source of a second frequency signal driving the light source; wherein the first source includes:
a frequency dither generator having an output terminal;
a voltage controlled oscillator operating at at least 1 GHz, having a control terminal connected to the output terminal of the frequency dither generator; and
a power amplifier having an input terminal coupled to an output terminal of the oscillator and an output terminal coupled to drive the phase modulator.

7. An optical fiber transmission system comprising:
a light source outputting a light beam which is coupled to an optical phase modulator;
an intensity modulator driven by an information-carrying RF signal and coupled to an output port of the phase modulator;
a connector for connecting an output port of the intensity modulator to an optical fiber;
a first source of a first frequency signal driving the phase modulator;
a second source of a second frequency signal driving the light source; wherein the second source includes:
an oscillator having an output terminal;
a frequency doubler coupled to the output terminal of the oscillator; and
a power amplifier coupled to an output terminal of the frequency doubler.

8. An optical fiber transmission system comprising:
a light source outputting a light beam which is coupled to an optical phase modulator;
an intensity modulator driven by an information-carrying RF signal and coupled to an output port of the phase modulator;
a connector for connecting an output port of the intensity modulator to an optical fiber;
a first source of a first frequency signal driving the phase modulator;
a second source of a second frequency signal driving the light source; wherein the first source outputs a signal having a frequency of 2.15±0.01 GHz with excursions of less than 50 MHz, and the second source outputs a signal having a frequency of 5.31±0.01 GHz.

9. An optical fiber transmission system comprising:
means for outputting a light beam;
means for modulating the means for outputting a light beam at a first high frequency wherein the means for modulating provides an alternating current;
means coupled to the output light beam for modulating the light beam at a second frequency;
means for intensity modulating the modulated light beam with an information-bearing signal; and
means for coupling the intensity modulated light beam to an optical fiber.

10. The system of claim 9, wherein the first and second frequencies are non-commensurate to one another.

11. A method of transmitting an optical signal through a fiber thereby to suppress stimulated Brillouin scattering, the method comprising the steps of:
providing a light beam from a source;
modulating the source of the light beam at a first frequency by applying a direct current and a high frequency alternating current to the source;
phase modulating the light beam at a second frequency;
intensity modulating by an RF information-carrying signal the phase modulated light beam; and
coupling the intensity modulated light beam to the fiber.

12. The method of claim 11, wherein the high frequency exceeds 1 GHz.

13. The method of claim 11, further comprising the step of dynamically varying the second frequency.

14. The method of claim 11, wherein the first and second frequencies are non-commensurate to one another.

15. The system of claim 1, wherein the light source is a DFB laser.

16. The system of claim 15, wherein the DFB laser outputs light having a wavelength of 1550 nm.

17. The system of claim 1, further comprising an erbium doped fiber amplifier coupled to the optical fiber.

18. The system of claim 1, wherein the information carrying RF signal is a multi-channel TV signal.

19. The system of claim 1, wherein the phase modulator and intensity modulator are a single integrated component.

20. The system of claim 1, wherein the first frequency signal is subject to frequency dithering.

21. The system of claim 9, wherein the second frequency is non-constant.

22. The method of claim 11, wherein the source is a DFB laser.

23. The method of claim 11, wherein the light beam has a wavelength of 1550 nm.

24. The method of claim 11, further comprising amplifying the intensity modulated light beam.

25. The method of claim 11, wherein the RF information-carrying signal is a multi-channel TV signal.

26. The method of claim 11, wherein the steps of phase modulating and intensity modulating are performed in a single integrated component.

27. The method of claim 11, further comprising the step of frequency dithering the second frequency signal.

28. The system of claim 1, wherein the first frequency signal at any one time has a single frequency.

29. The method of claim 11, wherein an any one time the light beam is phase modulated by a single frequency.

* * * * *